United States Patent
Anthony (10) Patent No.: US 7,788,838 B2
(45) Date of Patent: Sep. 7, 2010

(54) WATERFOWL DECOY WITH LEG MOVEMENT

(75) Inventor: Joseph Michael Anthony, Ellicott City, MD (US)

(73) Assignee: Avery Outdoors, Inc., Memphis, TN (US)

( * ) Notice: Subject to any disclaimer, the term of this patent is extended or adjusted under 35 U.S.C. 154(b) by 0 days.

(21) Appl. No.: 11/880,527

(22) Filed: Jul. 23, 2007

(65) Prior Publication Data

US 2008/0028664 A1 Feb. 7, 2008

Related U.S. Application Data

(60) Provisional application No. 60/835,334, filed on Aug. 3, 2006.

(51) Int. Cl.
*A01M 31/06* (2006.01)
(52) U.S. Cl. .................................. 43/3; 43/2
(58) Field of Classification Search ............... 32/2, 32/3, 26.1
See application file for complete search history.

(56) References Cited

U.S. PATENT DOCUMENTS

| 109,992 | A | | 12/1890 | Hart |
|---|---|---|---|---|
| 2,229,175 | A | | 9/1939 | Johnson |
| 2,704,416 | A | * | 3/1955 | Laird .......................... 446/158 |
| 2,835,069 | A | * | 5/1958 | Flye, Sr. ..................... 43/44.84 |
| 2,903,812 | A | | 9/1959 | Lewis |
| 3,115,721 | A | | 12/1963 | Story |
| 3,689,927 | A | * | 9/1972 | Boston et al. ................... 213/3 |
| 4,566,214 | A | * | 1/1986 | McCrory et al. ................. 43/3 |
| 4,845,873 | A | | 7/1989 | Hazlett |
| 4,896,448 | A | * | 1/1990 | Jackson ........................... 43/3 |
| 5,775,022 | A | | 7/1998 | Sumrall et al. |
| 5,809,683 | A | | 9/1998 | Solomon |
| 5,926,990 | A | | 7/1999 | Okimoto |
| 5,930,936 | A | * | 8/1999 | Parr et al. ........................ 43/3 |
| 6,339,893 | B1 | * | 1/2002 | Solomon .......................... 43/3 |
| 2005/0144828 | A1 | | 7/2005 | Lewis et al. |
| 2005/0160654 | A1 | | 7/2005 | Cosciani |
| 2007/0180755 | A1 | | 8/2007 | Neeley et al. |

* cited by examiner

*Primary Examiner*—Christopher P Ellis
(74) *Attorney, Agent, or Firm*—Walker, McKenzie & Walker, P.C.

(57) ABSTRACT

A waterfowl decoy has a body with a motor rotatably driving a shaft. A support rod is movably and eccentrically connected to the shaft. The support rod extends outwardly through an orifice in the body, rotation of the shaft causing the support rod to move inwardly and outwardly of the body through the orifice, and to swing upwardly and downwardly about the orifice. A foot on the outer end of the support rod performs a kicking action when the decoy floats in water. There may be two support rods extending through the belly portion of the waterfowl and reciprocating out of phase with each other.

1 Claim, 7 Drawing Sheets

Fig. 12

WATERFOWL DECOY WITH LEG MOVEMENT

CLAIM TO PRIORITY

Benefit under Section 119(e) of United States Code Title 35 is claimed of Provisional Patent Application No. 60/835,334 filed 3 Aug. 2006.

FIELD OF THE INVENTION

This invention relates to waterfowl decoys, particularly duck or goose decoys. The invention is particularly concerned with leg movement of the decoys.

BACKGROUND OF THE INVENTION

For many years hunters have used decoys when hunting ducks and geese, etc. Originally, these decoys where formed to look like the waterfowl being hunted and simply floated on the water or placed on land. More recently, some decoys have been made with one or more moving parts in an attempt to simulate a live waterfowl.

Parr et al. U.S. Pat. No. 5,930,936 discloses a waterfowl decoy which is orientated in a feeding position and has paddle members mounted on opposite ends of a rotated shaft. When the paddles are rotated by battery power, they splash the water on each side of the decoy. The paddles rotate in unison in a pure rotary motion on and about the same axis that is fixed in location relative to the body of the decoy.

Another decoy somewhat similar to Parr et al. has appeared on the market, and has its electric motor mounted outside the decoy with a foot mounted on each end of the motor shaft for pure rotation therewith.

Solomon U.S. Pat. No. 5,809,683 discloses a waterfowl decoy which is orientated in a swimming position and has wings extending from the sides through slots. Feet members are suspended downwards from the wings and move therewith. The wings are moved by an electric motor inside the decoy rotating a single crank engaging a common wing support of both wings.

BRIEF SUMMARY OF THE INVENTION

This invention is concerned with providing a decoy with one or more moving legs or parts that move in a simulated "kicking" or paddling action, whether the decoy is to be in a feeding position or any other position.

This invention is also concerned with providing a decoy in a feeding position, that is with the front end below the water and the rear tail end above the water, and which is animated to appear more life-like to waterfowl flying, swimming or standing nearby.

According to one aspect of the present invention there is provided a waterfowl decoy comprising a body with a motor and a rotatable shaft, the motor being drivingly connected to the shaft for rotation thereof. A support rod is movably and eccentrically connected to the shaft. The support rod extends outwardly through an orifice in the body, rotation of the shaft causing the support rod to move inwardly and outwardly of the body through the orifice and to swing upwardly and downwardly about the orifice.

According to another aspect of the present invention, there is provided a waterfowl decoy comprising a body with a motor and a rotatable drive shaft, the motor driving the drive shaft. The drive shaft has two cranks that are out-of-phase with respect to each other. The body has two orifices therethrough. Two support rods are pivotally connected to the cranks, the support rods extending through the orifices to outside the body. Decoy feet are attached to outer ends of the support rods.

According to yet another aspect of the invention, a waterfowl decoy comprises a body including a simulation of a rear tail end of a waterfowl, the body being weighted so that it floats in water with the rear tail end uppermost above the water. A motor and a rotatable shaft are in the body, the motor being drivingly connected to the shaft for rotation thereof. Two cranks are on the shaft, the cranks being 180 degrees out-of-phase with respect to each other relative to the shaft. Two support rods are movably connected to the cranks for angular movement relative to the cranks. The support rods extend outwardly through orifices in the body, one support rod moving outwardly as the other support rod moves inwardly through the orifices as the shaft rotates. A pair of feet are attached to the support rods, the feet each following a path of a loop when the motor rotates the shaft. The feet comprise web portions and leg portions, the leg portions being mounted on the support rods, and the web portions being at an obtuse angle to the leg portions, whereby when the decoy is floating in water, the motor drives the feet to simulate a paddling motion.

According to yet a further aspect of the present invention, there is provided a waterfowl decoy comprising a body simulating at least a portion of the topside, underside, and lateral sides of a waterfowl. A motor mounted in the body, and two rotatable cranks spaced-apart and out-of-phase with respect to each other, the motor being drivingly connected to the cranks for rotation thereof. The underside has two orifices therethrough, these orifices being adjacent the lateral sides of the decoy. Two support rods are pivotally connected to the cranks, the support rods extending through the orifices. Decoy feet are attached to the support rods.

The pivotal connections of the support rods to the cranks may allow for non-planar movement of the support rods. This will occur when the orifices are spaced apart differently than the cranks. The orifices may be spaced apart a greater distance than the cranks are spaced apart.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts.

DETAILED DESCRIPTION OF THE PREFERRED EMBODIMENTS

The decoys illustrated in the drawings are ducks to be orientated when floating in water in the feeding position, with the head end out of sight and the rear or butt end projecting upwards above the water. Preferably, the rear end is shaped like the rear body and tail portion of a duck. The head end may be truncated as shown in FIG. 1 (and FIG. 12), or may be formed as the head end of a duck, or other waterfowl, or formed otherwise as discussed later.

Figure 1:
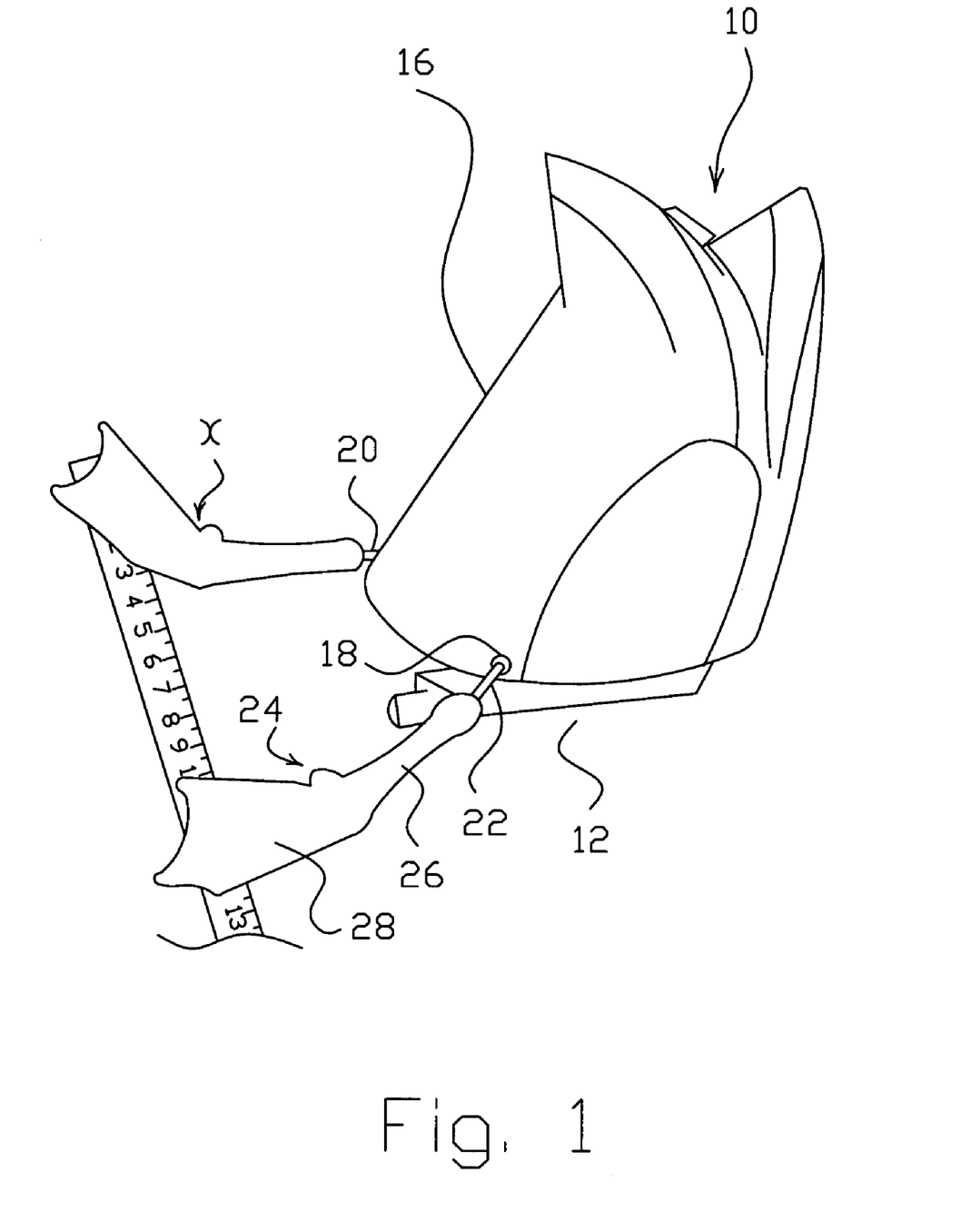
FIG. 1 shows a waterfowl decoy according to the present invention in perspective view from above, with a ruler under feet of the decoy to indicate size.
Figure 2:
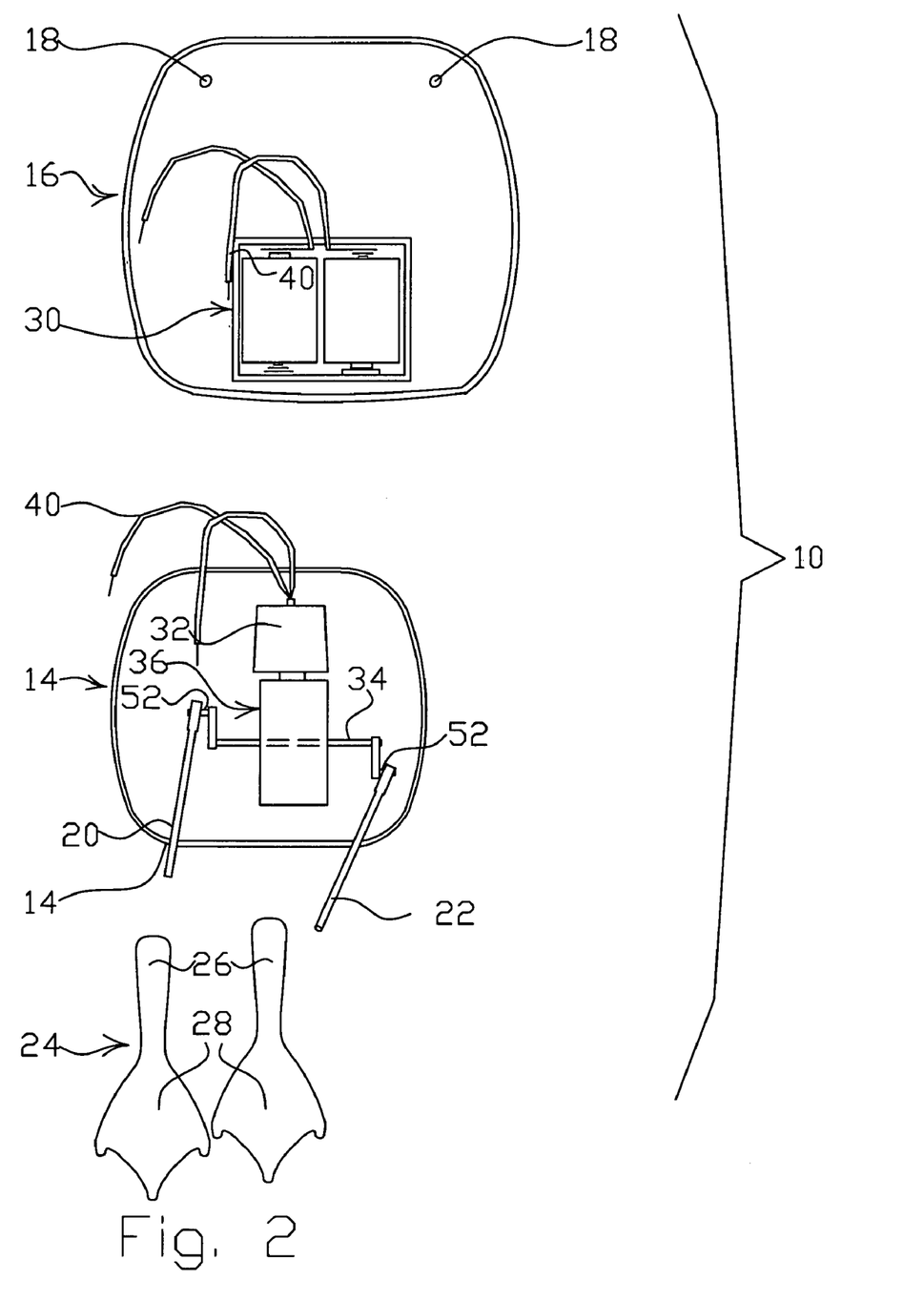
FIG. 2 is the decoy of FIG. 1 in an exploded view showing separately a body portion, a base portion, and two feet.

In FIG. 1 the decoy 10 has no head end, and a "keel" weight 12 under a base portion 14 (see FIG. 2) keeps the decoy orientated in the feeding position of FIG. 1. The decoy has a body portion 16, in the form of the rear end of a duck, with the base portion connected to a lower end of the body portion. The keel weight 12 is attached to the underside of the base portion. The lower part of the body portion 16 has two orifices 18 through which outwardly extend two feet support rods 20, 22. Molded plastic duck feet 24 are attached to the outer ends of the support rods. These feet have leg portions 26 and web portions 28, and the rods 20, 22 penetrate into the leg portions 26. The leg portions are attached to the rods in any suitable manner, e.g., by interference fit, gluing, screws, rivets, welding, etc. Each support rod forms a watertight sliding fit with its respective orifice 18. The orifices may be formed as holes, or reinforced holes, in the body portion, but are preferably formed by watertight grommets. These grommets may be of resilient material, or of machineable hard material, and may be formed as flanged grommets, or as pivotal ball and socket arrangements. They may be in any form of watertight joints allowing sliding and pivoting action of the support rods 20, 22. These orifices 18 are spaced apart laterally in what would be the underside (e.g. the belly) of the decoy, if the decoy were a complete waterfowl floating in a normal position on the water. As shown in FIGS. 1 and 2, although these orifices 18 are in the "underside" of the decoy, they are closely adjacent the lateral sides of the decoy. This enables the legs of the waterfowl to extend from the body of the decoy in a realistic location, and at an acute angle to the central vertical plane through the decoy.

In FIG. 2 the decoy 10 has been partly dissembled. The middle portion of FIG. 2 shows the base portion 14 in plan view as it would be when floating in water. The upper portion of FIG. 2 shows the rear end 16 of the decoy detached from the base 14 and in an inverted position. The lower portion of FIG. 2 shows the two feet 24 of the decoy detached from their support rods 20, 22. When assembled, the rear end 16 of the decoy is releasably attached to the base 14 in any suitable manner to form a watertight joint, e.g. by using clamped-together, abutting flanges with a resilient gasket in-between. In the embodiment of FIGS. 1 and 2, the two parts are a snug fit together and are sealed by a releasable glue joint.

As can be seen in the upper portion of FIG. 2, a battery unit 30 is housed in the rear end 16 of the decoy. Although two 1.5 volt alkaline batteries are shown, it is preferable to use lighter-weight, long-life rechargeable batteries. The outer shell of the decoy rear end 16 contains an on/off switch (not shown) to actuate the device. If rechargeable batteries are used, a charging port may be located adjacent this switch.

The middle portion of FIG. 2 shows an electric motor 32 drivingly connected to a transverse rotatable shaft 34 via a reduction gear transmission 36. The shaft 34 rigidly carries a crank 38 at each outer end; these cranks being spaced apart axially and disposed rotationally 180 degrees apart, as can be seen. The distal end of an arm of each crank 38 has a crank pin 52 pivotally connected to a respective one of the support rods 20, 22. These pivotal connections may be simple rotary connections, sleeves, or ball races. These connections may be provided with a degree of "slop", or ball joints or other types of universal joints may be employed as the pivotal connections, to allow for non-planar movement of the support rods as they move through the orifices 18 and pivot relative to the cranks 38. Preferably, these pivotal connections are spaced apart a lesser distance than the orifices 18, so causing the support rods to angle outwardly laterally (see FIG. 1), and providing a more compact driving mechanism. The battery unit 30 is connected to the motor 32 by wires 40.

Figure 3:
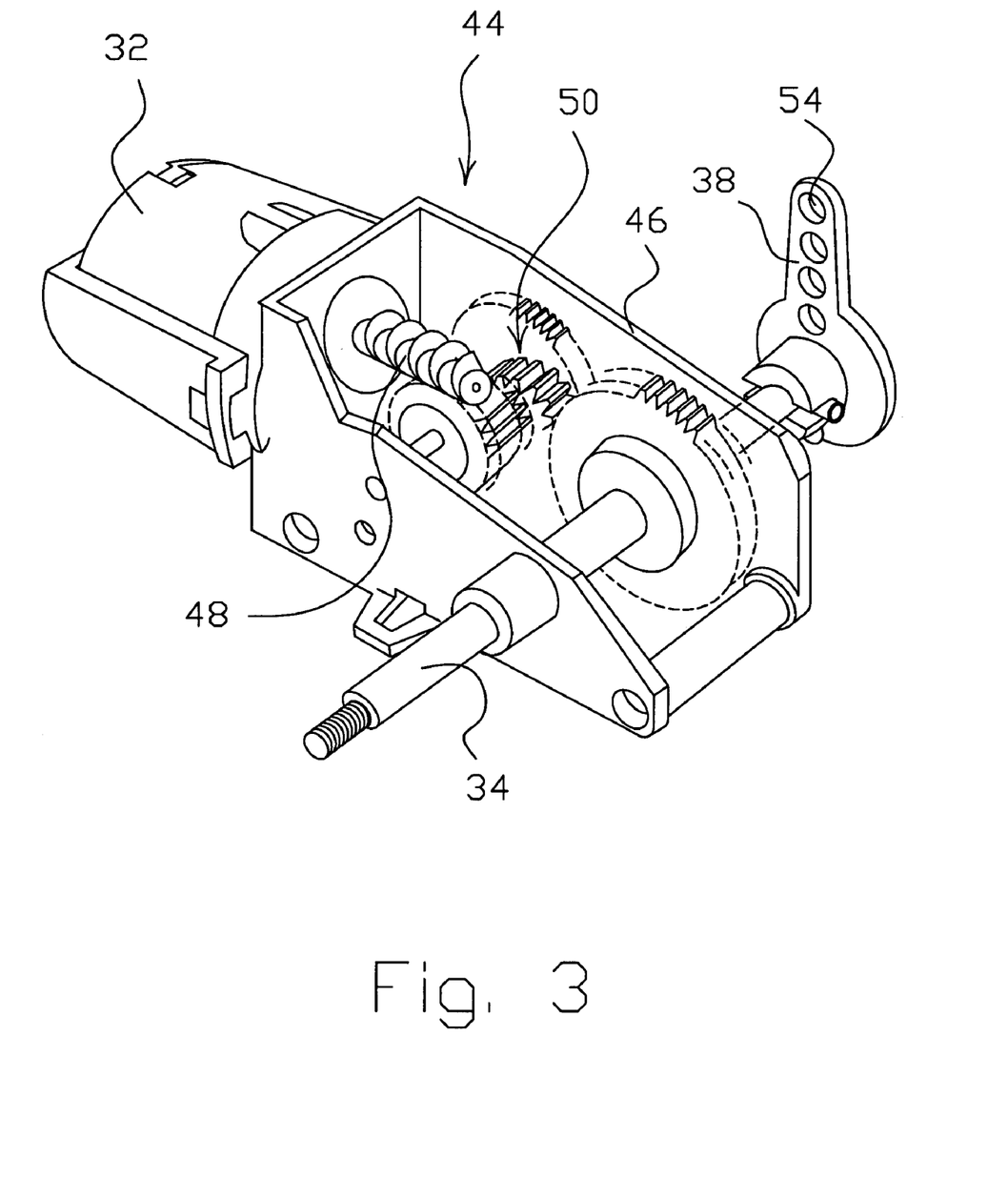
FIG. 3 is a diagrammatic perspective view of a drive unit of the decoy of FIGS. 1 and 2.

FIG. 3 shows a perspective view of the drive unit 44 from the left side of FIG. 2, the drive unit comprising the motor 32, reduction transmission 36 (see FIG. 2), and shaft 34. One of the cranks 38 and other parts have been omitted, and the near side of a housing 46 of the transmission is shown transparent to more clearly illustrate the transmission. The motor 32 drives a worm gear 48 that in turn rotates the shaft 34 through a series of gears 50. As can be seen, a crank arm 38 is securely mounted on the right hand end of the shaft 34. A similar crank arm (not shown in FIG. 3) is similarly mounted on the opposite end of the shaft 34, but disposed 180 degrees out of phase—as can be understood from FIG. 2. Such a drive unit is that from Tamiya, Inc., Shzuoka-City, Japan marketed under the designation "Worm Gear Box H.E.". The crank pin 52 is in the form of a short stub shaft (see FIG. 2) and is mounted through a hole 54 at the end of each crank arm. These crank pins 52 form, carry, or engage the pivotal connections to the support rods 20, 22.

Figure 4:
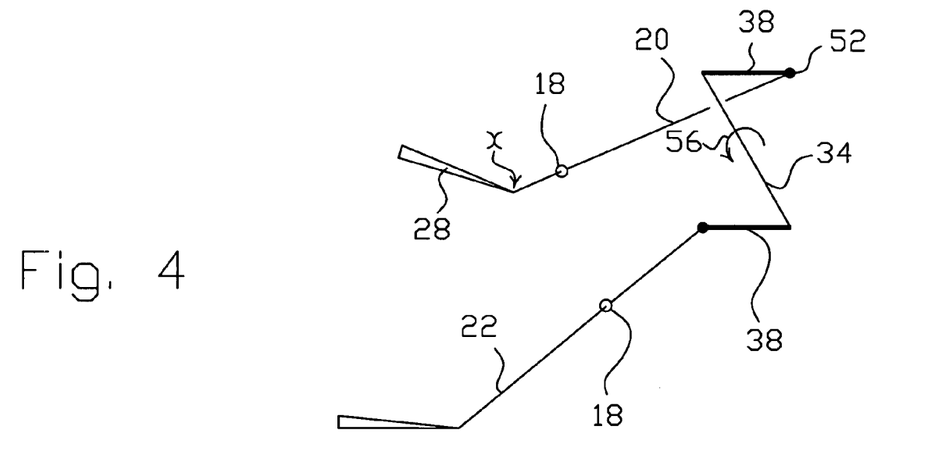
FIGS. 4 and 5 are schematic perspective views of a driving linkage for the feet of the decoy of FIGS. 1 to 3 showing two positions 90 degrees apart of drive cranks.
Figure 5:
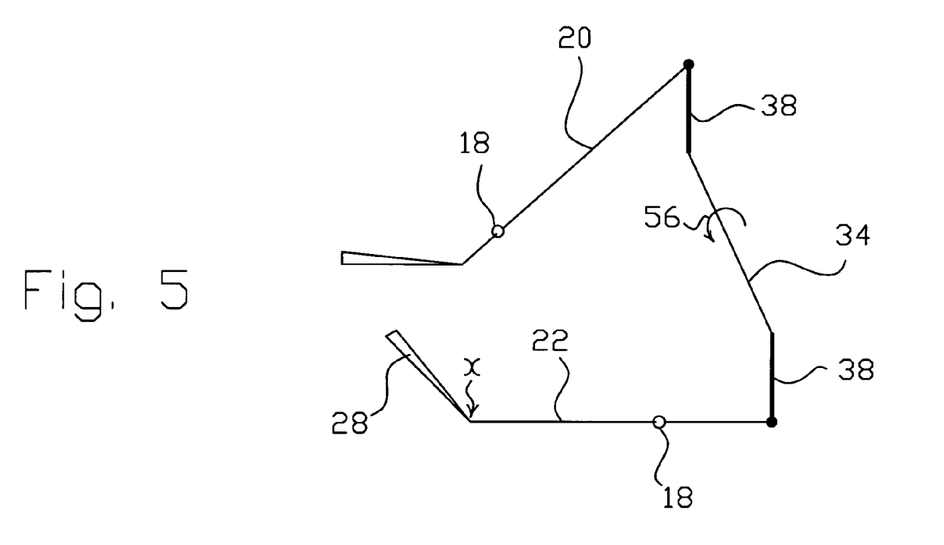

FIGS. 4 and 5 schematically illustrate the driving of the decoy's webbed feet 28 (which are orientated the same as in FIG. 1). The arrow 56 shows the rotational direction of the shaft 34, and in FIG. 5 the shaft 34 is rotated 90 degrees counterclockwise past the position in FIG. 4. In FIG. 5 the cranks 38 are vertical, and in FIG. 4 the cranks 38 are horizontal. The cranks move the support rods 20, 22 inwards and outwards through the orifices 18 relative to the decoy's body 16. At the same time, the rods 20, 22 oscillate upwards and downwards relative to the decoy's body 16 and the water. This is due to the guiding action of the orifices 18, which are fixed relative to the rotational axis of the shaft 34. The relative geometry between the effective length of the cranks 38, the length of the support rods 20, 22 and feet, and the positioning of the guiding orifices 18 will determine the exact nature of the path executed by the webs 28 of the feet 24. This will be a continuous closed circuit path and cause the webs 28 to move in a simulated kicking or paddling action. The closed circuit path may be designed to be a form of loop. The web portions 28 of the feet are at an obtuse angle x to the leg portions 26 and the support rods 20, 22—see also FIG. 1.

FIGS. 4 and 5 will now be compared. In FIG. 4, the support rod 20 is retracted in the body and ready to start moving outwards through its orifice 18. The other rod 22 is almost fully extended through its orifice 18. Whereas in FIG. 5, the rod 20 has pivoted counterclockwise about its orifice 18 and has started to move outwardly through the same orifice, while the rod 22 has pivoted clockwise about its orifice 18 and has started to retract through this orifice. It will be noticed that as one rod moves outwardly the other rod moves inwardly; also, as one rod pivots clockwise the other rod pivots counterclockwise. In this way the kicking or paddling action of each foot 24 of the decoy is achieved.

In operation, the assembled decoy is switched on and placed on the water with the keel down. The decoy floats on the water, and the webbed feet perform a paddling or kicking action. The animated decoy more realistically simulates a live fowl in its feeding position in which it uses its feet to control the position of its head under water.

It will also be realized that the decoy's feet move out of phase with each other, so creating a more realistic leg motion than with previous decoys. This out of phase angle is preferably 180 degrees, but could be less than 180 degrees, e.g. 120 degrees or 90 degrees.

As illustrated in the drawings, the crank 38 is in the form of an arm secured to the shaft 34 and extending radially outwards from the shaft 34 with a crank pin 52 at the distal end of the arm. However, this crank could be in the form of a disc, a cam, or the like, with an eccentric thereon for connection of a support rod, or may be in the form of any other mechanism for connecting the support rod to the shaft 34 eccentrically thereof, including simply a crank pin on the shaft itself. Thus, the expression "crank" as used throughout the specification and appended claims is hereby defined to embrace all of these arrangements, including the arrangements illustrated in the drawings.

Another embodiment of the invention will now be described with reference to FIGS. 6 to 12.

Figure 6:
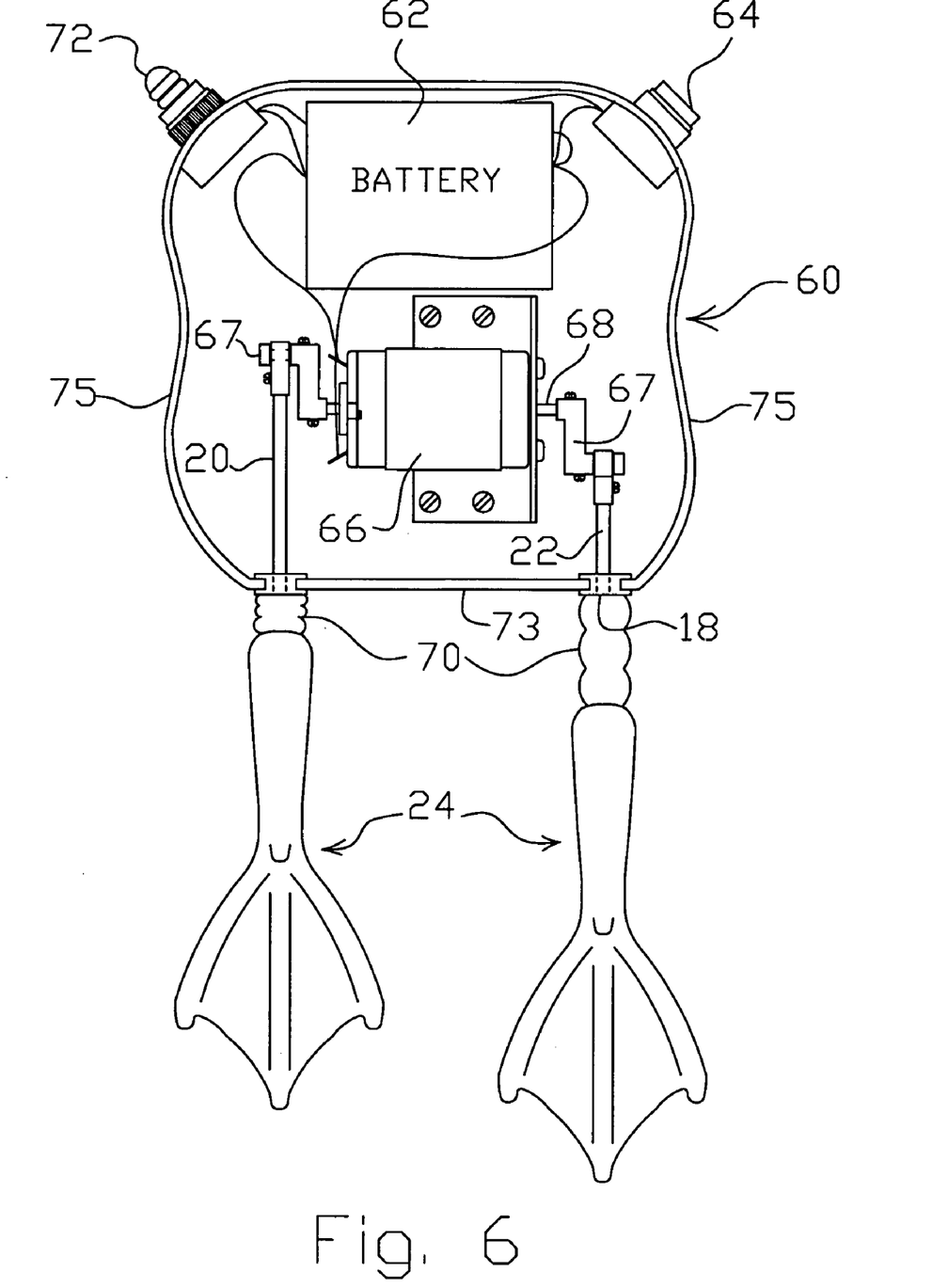
FIG. 6 is a plan view of the base portion of a waterfowl decoy of another embodiment of the present invention.

FIG. 6 is a plan view looking down into the base portion 60 of this embodiment. This is somewhat similar to the base portion 14 of the embodiment of FIGS. 1 and 2, but the battery 62 is rechargeable and mounted in the base portion with a charging port 64. Further, the drive transmission has been eliminated and the electric motor 66 drives the cranks 67 directly via its motor shaft 68 which extends from each end of the motor 66. The motor 66 is a slow speed motor and rotates at 300 rpm under no load and about 100 rpm or less under load. For very slow speeds, the cranks 67 could be mounted on a lay shaft driven via a reduction belt and pulley arrangement from the motor shaft 68. A convoluted boot or concertina member 70 extends in watertight manner between each orifice 18 and the corresponding foot 24. As the support rods 20, 22 reciprocate through the orifices 18, the boots 70 compress and extend maintaining a watertight arrangement. In FIG. 6, the left boot 70 is fully compressed while the right boot 70 is fully extended. A start switch 72 starts and stops the motor 66.

It will be noticed that in this embodiment the foot support rods 20, 22 are and move parallel to each other. The feet 24 extend from one wall 73 of the base portion 60, this wall 73 being a bottom wall or "belly" of the duck decoy, although in the operative feeding position of the decoy in water (see FIG. 12) this wall 73 is substantially vertical. It will also be noticed how the orifices 18 and the rods 20, 22 are adjacent the side walls 75 of the base portion 60.

Figure 7:
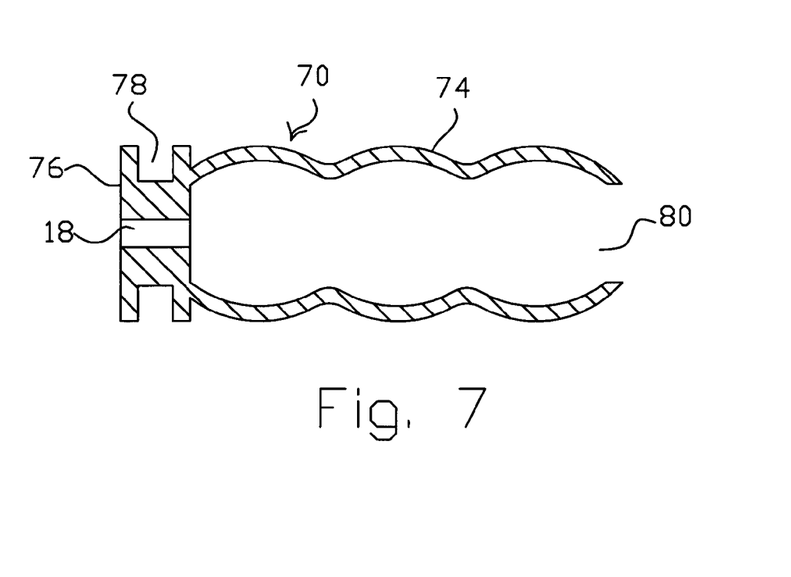
FIG. 7 is a longitudinal section of a bellows member of the embodiment of FIG. 6.

FIG. 7 is an enlarged longitudinal view of the boot or bellows member 70. A bellows portion 74 is integrally connected to a grommet portion 76 having the orifice 18 centrally therethrough. The grommet 76 has a peripheral annular groove 78 which engages the circumference of an aperture in the bottom wall of the base portion 60, the bottom wall being part of the belly of the duck. The walls of the groove may form a water resistant seal with the base and body portions, or an adhesive or sealant may be applied. Opposite the grommet 76, the bellows portion 74 has an open end 80 sized to fit over and be sealed to the leg portion of the duck's foot 24. The boot member 70 is molded of a resilient material resistant to water, sunlight, etc. In its compressed position (left side of FIG. 6) the boot member is about one third of its length in the extended position (right side of FIG. 6).

Figure 8:
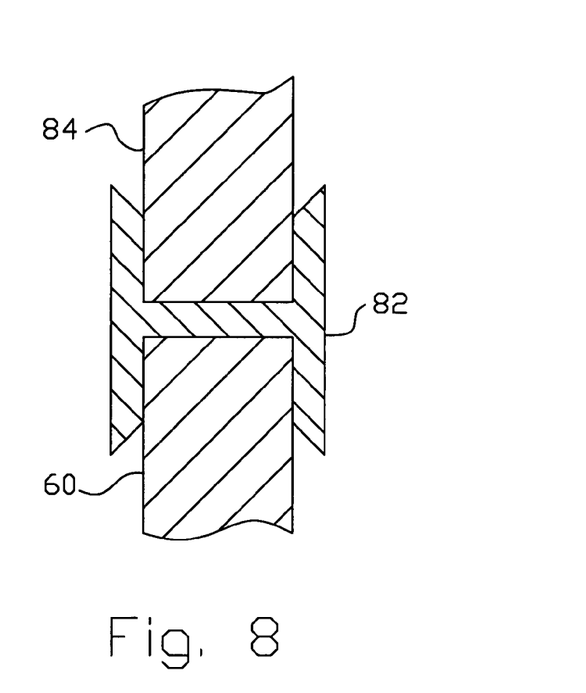
FIG. 8 is a sectional view of an assembled H-gasket connecting the body portion and the base portion of the embodiment of FIG. 6.
Figure 9:
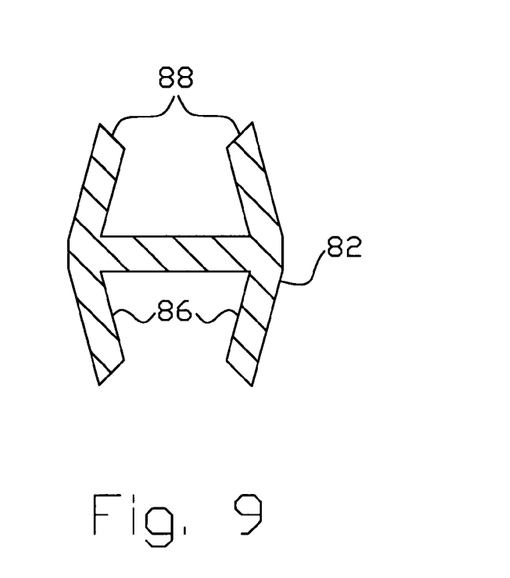
FIG. 9 is a similar sectional view of the H-gasket of FIG. 8 showing its configuration before it is assembled in the decoy.

FIGS. 8 and 9 show vertical sections of a sealing gasket 82 employed to mount the body portion 84 (see also FIG. 12) of the duck onto the base portion 60. The gasket is in the form of a deformable annular ring having upper and lower grooves. FIG. 8 shows the body and base portions 84, 60 engaged in the upper and lower grooves of the gasket. Preferably, the base portion 60 is glued in its groove, and the body portion is a tight sliding fit in its groove. This forms a watertight, or at least a splash resistant, connection of these portions. Additionally, Velcro (trademark) strips (not shown) may be employed to releasably reinforce the attachment of the body portion to the base portion. FIG. 9 shows the gasket 82 before it is assembled in the decoy. The walls 86 of the grooves are biased to converge inwardly so causing them to be a tight fit against the body and base portions. Further, the outer edges 88 of the walls 86 are tapered on the inside to facilitate assembly of the body and base portions into the gasket's grooves.

Figure 10:
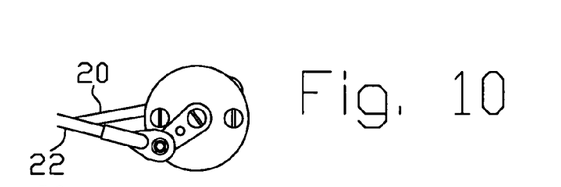
FIGS. 10 and 11 are fragmentary views illustrating a crank arrangement for driving the legs of the decoy.
Figure 11:
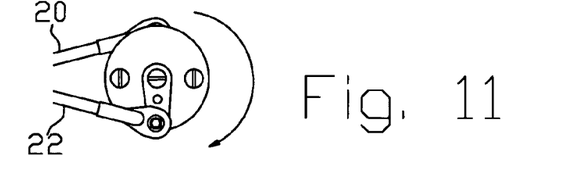

FIGS. 10 and 11 show a modified crank mechanism similar to that in FIG. 6. In FIG. 11 the crank is 45 degrees before its angular position in FIG. 10. The change in angular position of the feet support rods 20, 22 between FIG. 11 and FIG. 10 can clearly be seen. It is this feature that gives the duck's feet a distinctive kicking action—as previously illustrated in FIGS. 4 and 5.

Figure 12:
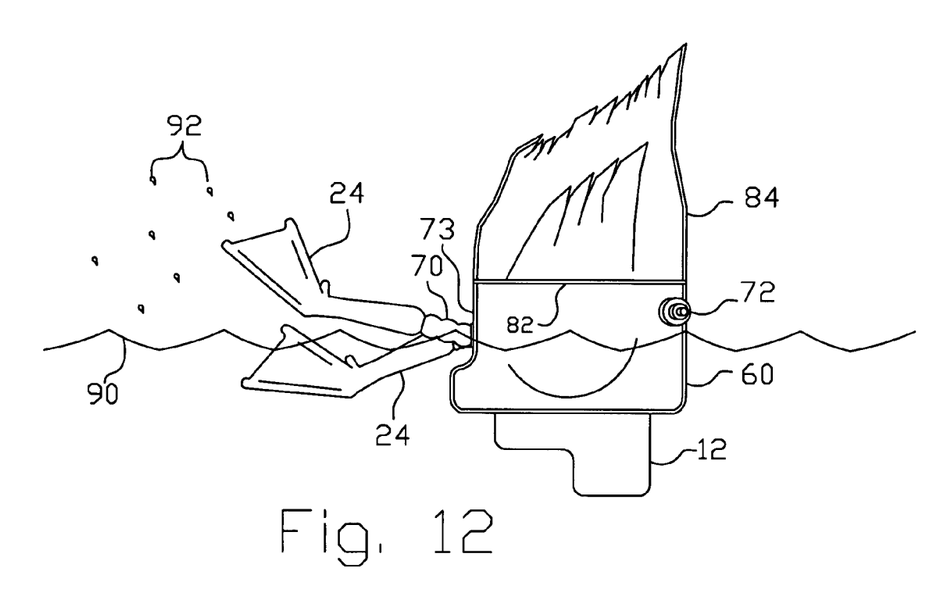
FIG. 12 shows the decoy of FIG. 6 floating in water with the legs kicking.

FIG. 12 illustrates the decoy in its operative feeding position floating in water having a surface 90. The base portion 60 is both below and above the water surface 90, while the body portion 84 is completely above the surface 90. The feet 24 can be seen extending from the now vertical "belly" of the decoy and performing a kicking action with the upper foot 24 effecting splashes 92 of water in the air. Each foot in turn pass below the surface 90 of the water and then is raised up above the surface 90. The body portion 84 is shaped and colored realistically as the rear end of a duck, and the feet 24 are also shaped and colored like those of the duck. This, coupled with the realistic kicking action and splashing of the feet 24, makes this decoy look like a live duck feeding in the water. When the decoy is tethered below the water surface it tends to move slowly in circles about the tether point.

In a modification, the base portion may be enlarged as a head end, which is submerged below the water, when the decoy floats. This head end could be shaped like the head end of a waterfowl, or simply be an enlarged plain shell. The head end enables the decoy to increase in buoyancy, and allows more room to house the battery unit and the motor. The keel weight could then be replaced, if necessary, by a weight or ballast inside the head end. The body of the decoy would then comprise the body end (i.e. the "butt" end) and the head end. These could be joined together in any suitable water-tight manner, e.g. telescoped together with an O-ring in-between, connecting flanges with a gasket in-between, or integrally joined together with an access hatch in the rear end or head end.

In another embodiment, the body could be formed, e.g. by molding, as one integral unit, and a removable hatch disposed in an upper portion of the body for providing access to the interior. This hatch could be located well above the waterline when the decoy is floating.

The orifices 18 could have inwardly extending tubes, integral with the decoy body, with the water-sealing joints at the inner ends of these tubes inwardly of the decoy body above the waterline. Such inward tubes could be shaped to accommodate any oscillating movement of the support rods 20, 22.

In a further modification, the decoy is provided with only one movable support rod. Thus, only one foot on one side of the decoy is "paddled", this enabling the decoy to move in circles in the water. A second stationary or loosely flapping foot may be located on the other side of the decoy.

The above described embodiments, of course, are not to be construed as limiting the breadth of the present invention. Modifications, and other alternative constructions, will be apparent which are within the spirit and scope of the invention as disclosed herein.

What is claimed is:

1. A wildfowl decoy, said wildfowl decoy comprising:
    (a) a buoyant body having a front end, a tail end, and a midportion interposed between said front end and said tail end; said front end having a weight such that said body has a weight distribution that causes it to float on a water surface with said front end submerged under the water surface, with said midportion being circumferentially contacted by the water surface, and with said tail portion extending upwardly above the water surface; said body having a pair of orifices therethrough, said orifices being spaced apart at a first distance;
    (b) a drive shaft mounted for rotation within said body, said drive shaft having a pair of cranks that are out-of-phase with respect to each other;
    (c) a motor drivingly connected to said drive shaft for rotation thereof;
    (d) a pair of feet support rods, respectively passing through and being guided by said orifices; each said support rods having an inner end being respectively connected to said cranks and an outer end outside said body, said respective connection of said cranks to said inner ends of said support rods being spaced apart at a second distance lesser than said first distance;
    (e) a pair of webbed feet respectively connected to said outer ends of said feet support rods;
    wherein rotation of said drive shaft by said motor causes said feet support rods to reciprocate into and out of said body as said feet support rods simultaneously pivot about said orifices in a non-planar movement, with one of the support rods pivoting clockwise as the other pivots counterclockwise about said respective orifices, with said feet alternately moving above and below the water surface in a splashing action.

* * * * *